United States Patent [19]

Holcombe, Jr. et al.

[11] Patent Number: 4,898,618

[45] Date of Patent: Feb. 6, 1990

[54] PAINTABLE COMPOSITION FOR PROTECTING METALS AND CERAMICS DURING THERMAL TREATMENT

[75] Inventors: Cressie E. Holcombe, Jr., Knox County; Lloyd R. Chapman, Anderson County, both of Tenn.

[73] Assignee: ZTP Coatings, Oak Ridge, Tenn.

[21] Appl. No.: 205,090

[22] Filed: Jun. 10, 1988

[51] Int. Cl.$^4$ ............................................. C09K 15/02
[52] U.S. Cl. .............................. 106/287.34; 106/286.1; 106/286.2; 106/286.3; 106/286.4; 106/286.5; 106/286.6; 106/286.7; 106/286; 106/8
[58] Field of Search ............. 106/287.34, 286.1, 286.2, 106/286.3, 286.4, 286.5, 286.6, 286.7, 286.8

[56] References Cited

U.S. PATENT DOCUMENTS

| | | | |
|---|---|---|---|
| 2,803,566 | 8/1957 | Smith-Johannsen | 106/286.7 |
| 3,130,061 | 4/1964 | McMahon | 106/287.34 |
| 3,647,695 | 3/1972 | Hasegawa et al. | 106/286.4 |

FOREIGN PATENT DOCUMENTS

| | | | |
|---|---|---|---|
| 0028630 | 3/1978 | Japan | 106/286.7 |
| 0014819 | 4/1980 | Japan | 106/286.7 |
| 0067760 | 4/1983 | Japan | 106/286.5 |
| 0749804 | 7/1980 | U.S.S.R. | 106/286.1 |

Primary Examiner—Paul Lieberman
Assistant Examiner—Helene Klemanski
Attorney, Agent, or Firm—Pitts and Brittian

[57] ABSTRACT

Paintable compositions for the formation of coatings on, for example, iron-based metals that, when dry, inhibit oxidation, decarburization and other similar reactions when the metal is heated to temperatures of about 2300 degrees F. (1300 degrees C.). The preferred binder portion of the composition, which in itself provides reasonable protection when dry, consists essentially of an aqueous colloidal silica solution together with an aqueous alkali hydroxide and oxides selected from the transition metals cobalt, chromium, iron, manganese, nickel, titanium, zinc and zirconium. The composition is benefitted by the addition of $Sb_2O_3$. The preferred ranges of composition are described as well as certain additives to enhance performance under various conditions. These include the use of filler materials, as well as high expansion additives when the coating is to withstand temperatures recycling of the metal, and low expansion additives to enhance spallation following a single heating. The coating is useful for other metal and ceramic substrates to prevent or reduce deleterious damage to the surface at high temperatures.

16 Claims, No Drawings

PAINTABLE COMPOSITION FOR PROTECTING METALS AND CERAMICS DURING THERMAL TREATMENT

DESCRIPTION

1. Technical Field

This invention relates to the treatment of metal and ceramic substrates during high temperature treatment thereof, and more particularly, to means for preventing or reducing deleterious damage to the surface of objects such as metal billets, slabs and castings during heat treatment operations applied thereto.

2. Background Art

It is commonplace in the metal-working industry to subject metals to various heating operations, e.g., for annealing and/or stress relieving or in conjunction with hot working operations. For example, a steel billet or slab, prior to rolling into rod or sheet, is commonly placed in a heat-treating furnace in which it is uniformly heated. During such heating, the surfaces of the metal are especially liable to suffer the effects of oxidation phenomena, e.g., the formation of a layer of the metal oxide on the surface of the metal object and/or the selective oxidation of an alloying constituent of the metal. The latter phenomenon is particularly exemplified by the surface decarburization of steel or other ferrous alloys. The effects may be exhibited by the formation of an oxide scale or, in the case of decarburization, by the creation of a surface layer which has changed chemical and physical characteristics. If this layer is extensive, it subsequently must be removed. Metal losses incurred in these ways can be severe and, therefore, very costly. The high temperature treatment of ceramic substrates also often leads to deleterious degredation of the surface. This is evidenced by corrosion, erosion and the like. It is, therefore, of prime importance that some means should be found of shielding the surfaces from reactive atmospheres during any heat-treating operation.

It is well known that, in order to reduce these losses, small items may be subjected to their necessary heat treatment in a controlled inert or non-oxidizing atmosphere. Although this expedient has been fairly successful in many instances, expensive equipment is necessary, e.g., gas flow control apparatus and specially-constructed furnaces in which air may be prevented from entering. Furnaces in which the atmosphere can be controlled are suitable for heating small objects such as tools but it is costly to make use of such apparatus to heat large objects such as billets and slabs which may weigh several tons. Moreover, if the metal object is required to be removed from the furnace while still in a heated condition, fairly severe oxidation, decarburization or the like can still take place upon exposure to the atmosphere.

Alternative means of protecting the surfaces of metal articles to be heated have therefore been developed. Thus, it is known to apply a paint to the surfaces of the metal before subjecting it to heat treatment. Such paints may include materials which are preferentially oxidized (e.g., powdered aluminum, ferrosilicon or silicon) and are thus intended to function in a sacrificial manner. Other types of paint depend upon the physical exclusion of the atmosphere from the surface by the ability of their constituents to form a glaze when heated. Materials used in such paints are mixtures of various refractory oxides, slags, silica and ground glass. The preferentially oxidized materials mentioned above have also been included in the glaze-forming preparations. Varying degrees of success have been achieved by the use of these known paints which are generally applied to the metal surface as a layer of the order of ⅛ inch thick. However, none of them has been found to be capable of consistently reducing oxidation losses to a satisfactory degree although, in some instances, the amount of metal lost as oxide scale has been reduced by as much as 70%. A reduction in losses even of this magnitude is, however, considered unsatisfactory in that the degree of oxidation still suffered is inevitably accompanied, in the case of steels, by surface decarburization. Thus, a machining operation is necessary to remove the decarburized layer.

It may be observed in this connection that where a mechanical protection is to be achieved, as by a glaze, it is important that there should be no cracks or pinholes in the protective layer. Otherwise, the oxidation and/or decarburization effects tend t spread beneath the glaze far beyond the crack or pinhole itself.

Typical of these prior art coatings is that described in U.S. Pat. No. 3,440,112 issued to F. E. G. Ravault on Apr. 22, 1969. This composition included silicon carbide, ferrosilicon, silica flour, bentonite, powdered glass and sodium or potassium cryolite to form a fusible glaze. Another of the prior art protective coatings is described in U.S. Pat. No. 3,861,938, issued to R. P. Jackson on Jan. 21, 1975. The coating of this reference involves the use of an alkali-stabilized sol form of silica together with chromic oxide formed by the in situ oxidation of chromium metal.

U.S. Pat. No. 3,037,878, issued to R. J. Cowles, et al. on June 5, 1982, describes another coating composition for use in protecting metals against oxidation and/or decarburization during heat treatment. The composition involves oxides of aluminum, silicon and an alkali metal which fuse to form various crystalline phases. This coating is used at thicknesses of 1/64 to 1/32 inch (15.6 to 31.2 mils).

Another protective coating is described in U.S. Pat. No. 3,301,702, issued to S. L. Ames, et al. on Jan. 31, 1967. This coating, for which the surface must first be cleaned, consists of an alkali metal silicate and aluminum oxide.

A coating based upon sodium metaborate is described in U.S. Pat. No. 2,785,091, issued to C. A. M. Rez on Mar. 12, 1957; a coating based upon mica is described in U.S. Pat. No. 2,774,681, issued to P. Huppert, et al. on Dec. 18, 1956; and coatings based upon self-spalling ceramics are described in U.S. Pat. Nos. 3,459,601 and '602, issued to E. E. Muller on Aug. 5, 1969. Other patents generally related to protective coatings are: U.S. Pat. Nos. 3,399,078, issued to C. A. M. Bang on Aug. 27, 1968; 3,454,433, issued to E. E. Muller on July 8, 1969; 3,178,321, issued to W. R. Satterfield on Apr. 13, 1965; 3,178,322, issued to E. B. Schneider on Apr. 13, 1965; and 3,677,796, issued to R. T. Girard, et al. on July 18, 1972.

In general, the compositions of the prior art have certain drawbacks. Those compositions that form glass-like coatings at the temperatures of heat treatments often transfer a portion of the glaze to rolls of a rolling mill or to other handling apparatus. This type of glaze also can cause coated pieces to bond together when placed in contact with each other at a high temperature. This, of course, is detrimental to the equipment. Some coatings can only be removed using some form of substantial abrasion after the heat treatment step. For other compositions, numerous layers must be applied (and dried) before a thickness is achieved that will give satisfactory protection against oxidation and/or decarburization, etc. Furthermore, as discussed above, the surface of the item to be protected must be first cleaned before use of certain of the protective coatings.

Accordingly, it is an object of the present invention to provide a paintable composition for use in the protection of a substrate, such as a metal object, against corrosion, oxidation and/or decarburization, etc., during heat treating steps at elevated temperatures to about 2400 degrees F.

It is another object to provide a coating composition for this protection that can be applied to the surface in thin coats (a few mils) and result in satisfactory protection.

Another object is to provide a protective coating composition that can be applied without previous treatment of the surface.

Still another object of the present invention is to provide a protective coating for items to be heat treated, with the coating being easily removed following the needed protection.

A further object of the present invention is to provide a protective coating composition which will not adversely affect apparatus used to process the item after the heat treating step or cause similarly coated pieces to bond together during heating.

It is also an object of the present invention to provide a coating composition that can be used on essentially all iron-based materials and, thus, is compatible with the various expansion behaviors of these materials.

These and other objects of the present invention will become apparent upon a consideration of the full description of the invention which follows.

DISCLOSURE OF THE INVENTION

In accordance with the present invention, there is provided a composition which can be painted upon metal surfaces to be protected against oxidation and/or decarburization, etc., during heat treating steps to about 2400 degrees F. (1300 degrees C.). This is a water-based composition that, when dry, is adherent and highly water insoluble. This composition is particularly applicable for iron-based materials, although it has use with other metals and ceramics. The preferred composition includes colloidal silica ($SiO_2$), potassium hydroxide (KOH) and transition metal oxides (TMO). Other alkali ions can be used, such as Li, or Na, and various powder additives can be used when those powder additives are compatible with alkaline systems having a pH of about 11. Specifically, the TMO of value is the oxide of any transition metal selected from cobalt, chromium, iron, manganese, nickel, titanium, zinc and zirconium. Of these, the oxides of cobalt and manganese are preferred. Essentially complete protection of iron-based metals against oxidation is achieved, and decarburization is limited to a thickness of less than 2 mils, with less than 10 mils coating thickness. The preferred levels of these main ingredients are: 23–47 wt % colloidal silica solution (30% colloidal $SiO_2$, 0.45% $Na_2O$); 28–56 wt % potassium hydroxide solution (45% KOH in water); and 19–25 wt % TMO (oxide of selected transition metals). Certain pigments, fillers and expansion modifying agents can be added for specific applications. Also, additives can be included to improve paintability/suspension; these include sodium carbomethylcellulose (CMC), hectorite clay and/or acrylics.

BEST MODE FOR CARRYING OUT THE INVENTION

To be suitable for protecting metal against oxidation, decarburization and/or other deleterious chemical actions occurring at elevated temperatures, the coating material must be easily applied to provide a complete coat, readily dried, and preferably should be water insoluble when dry. Protection should be afforded by relatively thin coatings. Any diluent for these compositions must be removable by vaporization to provide a dry coating.

In order to evaluate compositions for use in the present invention, sample compositions were applied to the surface of a stainless steel spatula. The coatings were dried and then subjected to various performance tests such as adherence, paintability, hardness and water insolubility. Protection of the substrate metals was demonstrated by heating in air at temperatures up to about 2400 degrees F. (1300 degrees C.). Evaluation tests were generally conducted on type 4330 steel rods ½ inch in diameter and 1½ inch long. One to three thin coatings were applied. Complete drying was achieved between each coating when multiple coats were applied. The final protective coatings were less than 10 mils thick. Generally the coated test sample was heated to 1050–1080 degrees C. in one hour and held at that temperature for one hour. As in many other coating applications, the composition includes a basic binder portion together with additives to achieve selected properties for selected applications. These applications include, for example, substantially permanent coatings (e.g., for cyclic applications) versus coatings that are substantially self-separating ("pop-off").

Initial studies were performed to evaluate the essential constituents of the binder portion, referred hereinafter as the "Triplex Binder System" because of the three components: colloidal silica solution, alkali oxides (in the form of aqueous hydroxide solutions) and certain transition metal oxides. The hydroxide solutions typically are standard concentrations: 45% KOH in water; 50% NaOH in water and 18% $LiOH.H_2O$ in water. These can be represented as $SiO_2$, $R_2O$ (where R is Na, K and/or Li), and TMO (transition metal oxide), respectively. These initial tests demonstrated that when the colloidal silica (a commercial suspension of 8 millimicron $SiO_2$, 30 wt %, having 0.45 wt % $Na_2O$ and pH of 10.7) was used alone, poor adherence and poor high temperature protection occurs. Improved adherence was obtained, as well as protection, using a hydroxide solution (especially KOH) alone as the binder; however, problems associated with drying were experienced as well as the problem of handling a very caustic solution.

Although NaOH and LiOH can be used in the formulation, results using KOH (with all other constituents constant) were far superior. Accordingly, most further tests were limited to the use of the standard concentration KOH solution. Some tests were conducted with a 2:1 ratio of the standard KOH solution and the standard NaOH solution. These were commercial solutions as available from suppliers.

A mixture including colloidal silica suspension and KOH solution gave good adherence to the metal, good drying characteristics, and a hard coating. Some spalling occurred, however, during heating with the result that some oxidation/decarburization was noted. However, the addition of certain TMO's overcame this spalling tendency.

Tests using just the colloidal silica suspension and TMO constituents likewise exhibited inadequate protection even though initially the coating appeared to cover the surface. Further, a combination of just KOH and the TMO constituents gave results similar to KOH alone.

On the basis of these initial tests, a preferred range of the constituents of the Triplex Binder System was determined to be:

| Silica-containing Solution | 23–56.5 wt % |
|---|---|
| Potassium Hydroxide Solution | 14–57 wt % |
| TMO Addition | 8.5–53.5 wt % |

Various of the transition metal oxides were investigated for use in this binder composition. With all other constituents optimized, very good results were obtained using $Co_3O_4$ and $MnO_2$. Slightly poorer results were obtained using $Cr_2O_3$ and NiO, with marginal results being obtained using $Fe_2O_3$, $TiO_2$, ZnO and $ZrO_2$. Scandium oxide ($Sc_2O_3$) was not tested due to its cost, and oxides of copper and vanadium were not useful for various reasons. It will be understood that precursors of the TMO's can be used that will dissociate into, or form, the oxides at high temperatures. This includes, for example, nitrates, sulfates, carbonates, hydroxides, etc., as well as the TMO metals that will oxidize upon heating (firing).

The results were generally the same for various sources of the silica-containing solution. Tested in this connection were KASIL No. 6, NYACOL-830, and silicate Type D, as available from Nyacol Products, Inc., an affiliate of The PQ Corporation, P. O. Box 349, Ashland, Mass., and LITHSIL No. 4 available from Lithium Corp. of America, 449 N. Cox Road, Gastonia, N.C. All of these contained 27±9 wt % finely divided $SiO_2$ as colloidal suspensions or solutions in water, and all performed substantially equally. NYACOL-830 is a colloidal silica suspension. The other sources of silica-containing solution are pre-reacted $R_2O$-$SiO_2$, thus providing a portion of the needed $R_2O$ of the binder.

In order that the composition is easily "paintable", a diluent is needed. The diluent must, however, be completely removed during drying of the coating. The most typical diluent for these compositions is water. Aqueous acrylic diluents are also known for this use. Such a diluent is, for example, a combination of about 3 parts by weight of an aqueous acrylic polymer solution (e.g., Acrysol A-1 polyacrylic acid) with one part by weight of an aqueous acrylic emulsion (e.g., Rhoplex AC-64 Emulsion). The Acrysol A-1 and the Rhoplex AC-64 are available from Rohm and Haas of Philadelphia, Pa. The Rhoplex is 40 wt % water and 60 wt % acrylic polymer. The Acrysol is 75 wt % water and 25 wt % polyacrylic acid.

As stated above, various additions can be made to the Triplex Binder System for specific applications One such addition is a color pigment such as a yellow pigment (e.g , No. 51498, available from Drakenfeld-Ciba-Geigy Corp., P. O. Box 519, Washington, Pa.). This pigment is a pre-reacted material consisting essentially of 40 wt % $TiO_2$, and 20 wt % of each of the oxides $Cr_2O_3$, $Na_2O$ and $Sb_2O_3$. This particular additive, in addition to providing a color to the coating, was found to improve the performance of the resultant coating. A principal constituent of this particular pigment, other than the TMO and $R_2O$, is antimony oxide ($Sb_2O_3$). A study of this constituent, when added to the binder system, resulted in a range of optimum effectiveness of about 2.2 wt % to about 5.1 wt % in the binder although useful coatings can be obtained without the use of $Sb_2O_3$.

In order to minimize cracking, spalling etc., when an object is to be repetitively heated, the coating is improved through the use of a "high expansion" oxide additive. One such substance is nepheline syenite powder. Nepheline syenite is a holocrystalline, granular, igneous rock, whose principal constituents are $SiO_2$ (60.4%), $Al_2O_3$ (23.6%), $Na_2O$ (9.8%) and $K_2O$ (4.6%). This, when added at about 35 wt % to about 40 wt % to the binder, provides a coating that can be easily applied and withstands the effects of expansion and contraction of the base metal during any thermal cycling.

In contrast, there are applications where the coating must only withstand one heating cycle and, preferably, "self-destruct" after danger of oxidation/decarburization is eliminated. For such application a "low expansion" additive, or an additive with a large volumetric change from a phase transition, can be mixed with the binder. Typical materials for this application are $SiO_2$ powder (large volumetric change) or low expanding kyanite or kaolin clays; however, other clays are known for this property. A coating including $SiO_2$ powder was observed to "pop-off" when the coated object was quenched in air from 950 degrees C. A mixture of these two types of expansion additives can produce a coating that is more easily removed, as by a water spray or quench, following heat treating operations.

Other materials having known property-altering characteristics, or serving as fillers, can be added to the binder if they are compatible with the basic (about pH 11) nature of the solutions. These include, for example, $SiO_2$, $Fe_2O_3$, $Al_2O_3$ and $ZrO_2$.

The following examples contain compositions that are illustrative of coatings that are effective for the protection of an iron-based metal during heating to about 1300 degrees C. against any substantial oxidation and/or decarburization. The values of the constituents are in wt %.

EXAMPLE 1

| Binder: | Colloidal Silica Sol. (30% $SiO_2$ in Water) | 20.18 |
|---|---|---|
| | Potassium Hydroxide Sol. (45% KOH in Water) | 17.86 |
| | Yellow Pigment[a] | 12.00 |
| | Diluent: Water | 11.97 |
| Additive: | Nepheline Syenite | 38.00 |

EXAMPLE 2

| Binder: | Colloidal Silica Sol. (30% $SiO_2$ in water) | 16.93 |
|---|---|---|
| | Potassium Hydroxide Sol. (45% KOH in Water) | 10.35 |
| | Unreacted TMO: $Co_3O_4$ | 4.33 |
| | Yellow Pigment[b] | 4.33 |
| | Diluent: Water | 5.49 |
| | Acrylic | 7.44 |
| Additives: | Alumina Powder | 4.31 |
| | Nepheline Syenite | 37.04 |

-continued

| | Silica Powder | 9.09 |

(a) Pre-reacted TMO: 2.80% $Na_2O$; 4.80% $TiO_2$; 2.40% $Cr_2O_3$; 2.40% $Sb_2O_3$
(b) Pre-reacted TMO: 0.90% $Na_2O$; 1.81% $TiO_2$; 0.90% $Cr_2O_3$; 0.90% $Sb_2O_3$

EXAMPLE 3

| Binder: | Colloidal Silica Sol. (30% $SiO_2$ in Water) | 18.04 |
|---|---|---|
| | Potassium Hydroxide Sol. (45% KOH in Water) | 11.03 |
| | Unreacted TMO: $MnO_2$ | 4.45 |
| | Yellow Pigment(c) | 4.28 |
| | Diluent: Water | 5.85 |
| | Acrylic | 8.46 |
| Additives: | Alumina Powder | 4.10 |
| | Nepheline Syenite | 35.16 |
| | Silica Powder | 8.63 |

EXAMPLE 4 (Binder Alone)

| Colloidal Silica Sol. (30% $SiO_2$ in Water) | 12–56.5 |
|---|---|
| Potassium Hydroxide Sol. (45% KOH in Water) | 14–57 |
| TMO* | 8.5–53.5 |
| $Sb_2O_3$ | 0–5 |

*Oxides (pre-reacted or physically mixed) of at least one of the metals cobalt, manganese, chromium, nickel, iron, titanium, zinc, zirconium.
(c) Pre-reacted TMO: 0.86% $Na_2O$; 1.71% $TiO_2$; 0.86% $Cr_2O_3$; 0.86% $Sb_2O_3$

EXAMPLE 5 (Binder Alone)

| Colloidal Silica Sol. (30% $SiO_2$ in Water) | 47 |
|---|---|
| Potassium Hydroxide Sol. (45% KOH in Water) | 29 |
| TMO* | 25 |

*Oxides (pre-reacted or physically mixed) of at least one of the metals cobalt, manganese, chromium, nickel, iron, titanium, zinc, zirconium.

EXAMPLE 6

| Binder: | Colloidal Silica Sol. (30% $SiO_2$ in Water) | 16.55 |
|---|---|---|
| | Potassium Hydroxide Sol. (45% KOH in Water) | 10.12 |
| | Unreacted TMO: $ZrO_2$ | 6.48 |
| | Yellow Pigment(d) | 4.42 |
| | Diluent: Water | 5.37 |
| | Acrylic | 7.76 |
| Additives: | Alumina Powder | 4.21 |
| | Nepheline Syenite | 36.21 |
| | Silica Powder | 8.89 |

(d) Pre-reacted TMO: 0.88% $Na_2O$; 1.77% $TiO_2$; 0.88% $Cr_2O_3$; 0.88% $Sb_2O_3$

EXAMPLE 7

| Binder: | Colloidal Silica Sol. (30% $SiO_2$ in Water) | 14.70 |
|---|---|---|
| | Potassium Hydroxide Sol. (45% KOH in Water) | 8.75 |
| | Unreacted TMO: $MnO_2$ | 4.07 |
| | Yellow Pigment(e) | 2.40 |
| | Diluent: Water | 11.55 |
| Additive: | Nepheline Syenite | 58.51 |

EXAMPLE 8

| Binder: | Colloidal Silica Sol. (30% $SiO_2$ in Water) | 17.68 |
|---|---|---|
| | Potassium Hydroxide Sol. (45% KOH in Water) | 10.53 |
| | Unreacted TMO: $MnO_2$ | 3.66 |
| | $Fe_2O_3$ | 2.14 |
| | Diluent: Water | 13.89 |
| Additives: | Nepheline Syenite | 26.00 |
| | Kaolin | 26.00 |

(e) Pre-reacted TMO: 0.48% $Na_2O$; 0.96% $TiO_2$; 0.48% $Cr_2O_3$; 0.48% $Sb_2O_3$

EXAMPLE 9

| Binder: | Colloidal Silica Sol. (30% $SiO_2$ in Water) | 21.26 |
|---|---|---|
| | Potassium Hydroxide Sol. (45% KOH in Water) | 12.99 |
| | Unreacted TMO: $Co_3O_4$ | 4.44 |
| | Yellow Pigment(f) | 11.11 |
| | Black Pigment(g) | 33.33 |
| | Diluent: Water | 6.89 |
| | Acrylic | 9.97 |

EXAMPLE 10 (Binder Alone)

| Silicate Solution (K, Na, Li) (27 ± 9% $SiO_2$; 1.6–14% $R_2O$; $H_2O$) | 64–83% |
|---|---|
| $R_2O$ Aqueous Solution (Hydroxide of K, Na, Li) (45% KOH, 50% NaOH, 18% $LiOH \cdot H_2O$ in Water) | 6–28% |
| TMO* | 8–11% |
| $Sb_2O_3$ | 0–2% |

*Oxides (pre-reacted or physically mixed) of at least one of the metals cobalt, manganese, chromium, nickel, iron, titanium, zinc, zirconium.
(f) Pre-reacted TMO: 2.67% $Na_2O$; 5.35% $TiO_2$; 2.67% $Cr_2O_3$; 2.67% $Sb_2O_3$
(g) Pre-reacted TMO: 24.86% $Cr_2O_3$; 15.24% $Fe_2O_3$ From the foregoing, it will be understood by those versed in the art that a type of composition has been provided to use as a coating for iron-based metals to inhibit oxidation, decarburization or the like during high-temperature treatments. Although directed specifically toward coatings for iron-based metals, the compositions have applications for other metals, such as copper and titanium, ceramics and/or graphite. The general formulation includes a silica-containing liquid, an alkali hydroxide solution and selected oxides of the transition metals cobalt, manganese, chromium, nickel, iron, titanium, zinc, and zirconium. Of particular value is potassium hydroxide, and the oxides of cobalt and manganese. Special formulations using, as a "binder", the general constituents together with additives provides coatings having selected properties. In this connection, nepheline syenite provides additional expansion properties and antimony oxide ($Sb_2O_3$) provides a tighter bond to the base metal and a harder coating.

The additives to the Triplex Binder System are typically from the $R_2O$-$Al_2O_3$-$SiO_2$ system. For example, nepheline syenite is a mixture of $Na_2O$, $K_2O$, $Al_2O_3$ and $SiO_2$. Kaolin and kyanite are mixtures of $Al_2O_3$ and $SiO_2$. With these additives, and diluents selected from water and aqueous-based acrylics, paintable coating compositions are produced with the following ranges of principal constituents, based upon the total weight of the paintable composition: $SiO_2$, 35–47%; $Al_2O_3$, 9–18%; $R_2O$, 7.5–15%; and TMO, 5–10%. Additionally, these useful compositions typically contain 0.3–0.9% $Sb_2O_3$. The remaining constituent is a diluent in the form of water or an aqueous-based acrylic (up to 44%). The types of aqueous acrylics for use in these compositions will be known to those persons skilled in the art. Calculated on a fired basis, these ranges become: $SiO_2$, 52–64%; $Al_2O_3$, 14–27%; $R_2O$, 11–21%; TMO, 7.5–14%. When $Sb_2O_3$ is added on a fired basis, it is typically 0.5–1.5%.

It is to be understood that the examples given herein are only exemplitive of the compositions having use in the protection of iron-based metals during heat treatments at elevated temperatures. As such, these examples are not given as limitations of the invention. Rather, the invention is to be limited only by the appended claims and their equivalents when read together with the detailed description herein.

We claim:

1. A paintable composition for producing, when dry, a coating for metal and ceramic substrates to inhibit oxidation, decarburization and similar deleterious reactions when said substrates are exposed to elevated temperatures, said composition consisting essentially of:
   about 12–83 wt % aqueous-silica-containing liquid having about 27±9 wt % silica;
   about 6–57 wt % $R_2O$ aqueous solution, where R is selected from Na, K, Li and mixtures thereof; and
   about 8.0–53.5 wt % of at least one transition metal component selected from the oxides and precursors of oxides of cobalt, chromium, iron, manganese, nickel, titanium, zinc and zirconium, based on the total weight of the composition.

2. The paintable composition of claim 1 wherein said aqueous silica-containing liquid is an aqueous colloidal silica solution having about 30 wt % silica in water.

3. The paintable composition of claim 1 wherein said transition metal component is at least one transition metal oxide and said $R_2O$ aqueous solution is an aqueous hydroxide solution selected from potassium hydroxide, sodium hydroxide, lithium hydroxide and mixtures thereof.

4. The paintable composition of claim 3 wherein said aqueous hydroxide solution is a solution of about 45% potassium hydroxide.

5. The paintable composition of claim 3 further consisting essentially of about 0.5 to about 5.0 wt % $Sb_2O_3$.

6. The paintable composition of claim 3 wherein said transition metal oxide is selected from $Co_3O_4$, $MnO_2$ and mixtures thereof.

7. The paintable composition of claim 3 further comprising about 5 to about 17 wt % water and 9 to about 56 wt %, based upon the total weight of said composition, of a filler oxide selected from $SiO_2$, $Fe_2O_3$, $ZrO_2$, $Al_2O_3$ and mixtures thereof.

8. The paintable composition of claim 3 further comprising about 35–40 wt % nepheline syenite, said silica-containing liquid, said potassium hydroxide solution, said transition metal component and an aqueous diluent comprising about 60–65 wt %, sad nepheline syenite being a high expansion additive to inhibit cracking and spalling of said coating on said substrate during repetitive heating of said substrate at said elevated temperature.

9. The paintable composition of claim 3 further comprising about 9–52 wt % kaolin clay, said silica-containing liquid, said potassium hydroxide solution, said transition metal component and an aqueous diluent comprising about 48–91 wt %, said clay being a low expansion additive to accelerate spalling of said coating after quenching said substrate following said heating at said elevated temperature.

10. The paintable composition of claim 3 consisting essentially of:
    about 47 wt % aqueous colloidal silica solution having about 30 wt % finely divided $SiO_2$;
    about 29 wt % aqueous potassium hydroxide solution of about 45% potassium hydroxide; and
    about 25 wt % of said transition metal oxides.

11. The paintable composition of claim 10 further comprising about 5 to about 17 wt % diluent, based upon a total weight of said composition, said diluent selected from water and aqueous-based acrylics.

12. A paintable composition for producing, when dry, a coating for iron-based metals to inhibit oxidation, decarburization and similar reaction when said metals are exposed to elevated temperatures, said composition consisting essentially of:
    about 15 to about 45 wt % aqueous silica-containing liquid having about 27±9 wt % $SiO_2$;
    about 10 to about 35 wt % of a 45% aqueous potassium hydroxide solution;
    about 4 to about 30 wt % of at least one transition metal oxide selected from the oxides of cobalt, chromium, iron, manganese, nickel, titanium, zinc and zirconium; and
    about 5 to about 30 wt % aqueous diluent selected from water and aqueous-based acrylics, based on the total weight of the composition.

13. The composition of claim 12 further comprising about 0.1 to about 5.0 wt % antimony oxide.

14. The paintable composition of claim 12 further comprising about 9 to about 56 wt %, based upon the total weight of the composition of a filler oxide selected from $SiO_2$, $Fe_2O_3$, $ZrO_2$, $Al_2O_3$ and mixtures thereof.

15. A coating for iron-based metals to inhibit oxidation, decarburization and similar reactions when said metals are exposed to elevated temperatures, said coating, when fired, consisting essentially of:
    about 52 to about 64% $SiO_2$;
    about 11 to about 21% $R_2O$, where R is at least one alkali metal of the group consisting of potassium, sodium and lithium; and
    about 7 to about 14% of at least one transition metal oxide selected from oxides of cobalt, chromium, iron, manganese, nickel, titanium, zinc and zirconium, based on the weight of the fired composition.

16. The coating of claim 15 further comprising about 0.5 to about 1.5% $Sb_2O_3$.

* * * * *

UNITED STATES PATENT AND TRADEMARK OFFICE
CERTIFICATE OF CORRECTION

PATENT NO.   :   4,898,618

DATED        :   February 6, 1990

INVENTOR(S)  :   Cressie E. Holcombe, Jr.
                 Lloyd R. Chapman

It is certified that error appears in the above-identified patent and that said Letters Patent is hereby corrected as shown below:

On the title page, item [73]:
Please correct the name of the Assignee to read --ZYP Coatings, Inc.--

Signed and Sealed this

Sixth Day of August, 1991

Attest:

HARRY F. MANBECK, JR.

Attesting Officer

Commissioner of Patents and Trademarks